June 7, 1927.
F. H. GIBBS
1,631,318
ANTIFRICTION BEARING APPLICATION
Filed June 16, 1926
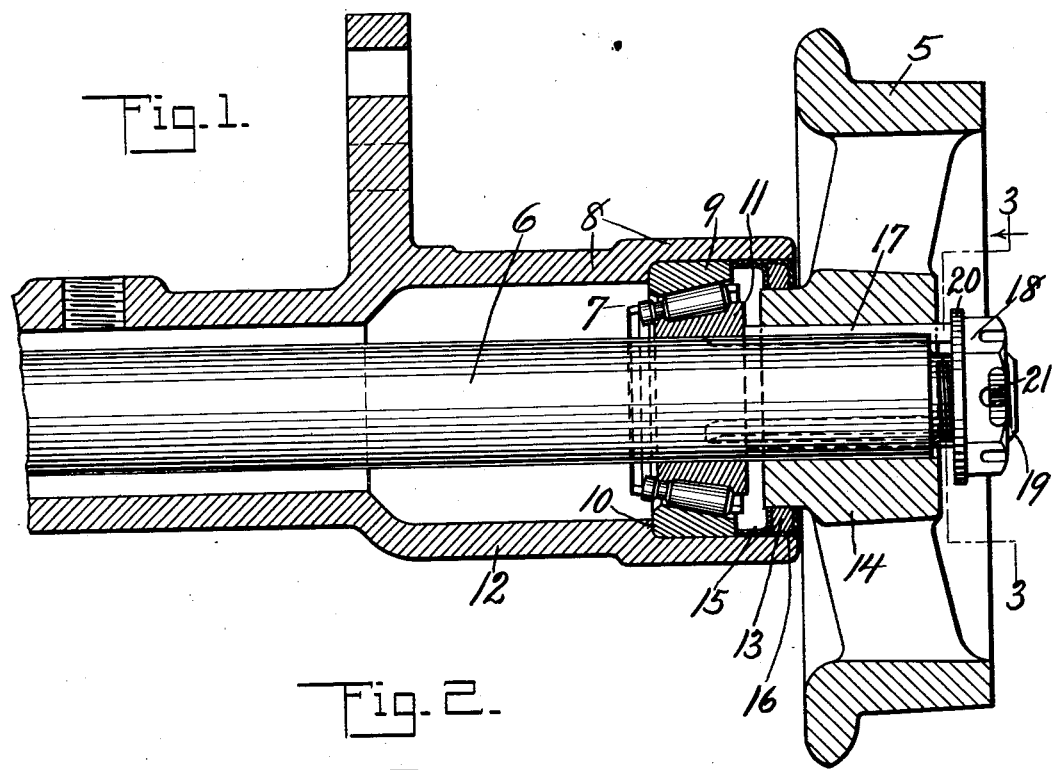
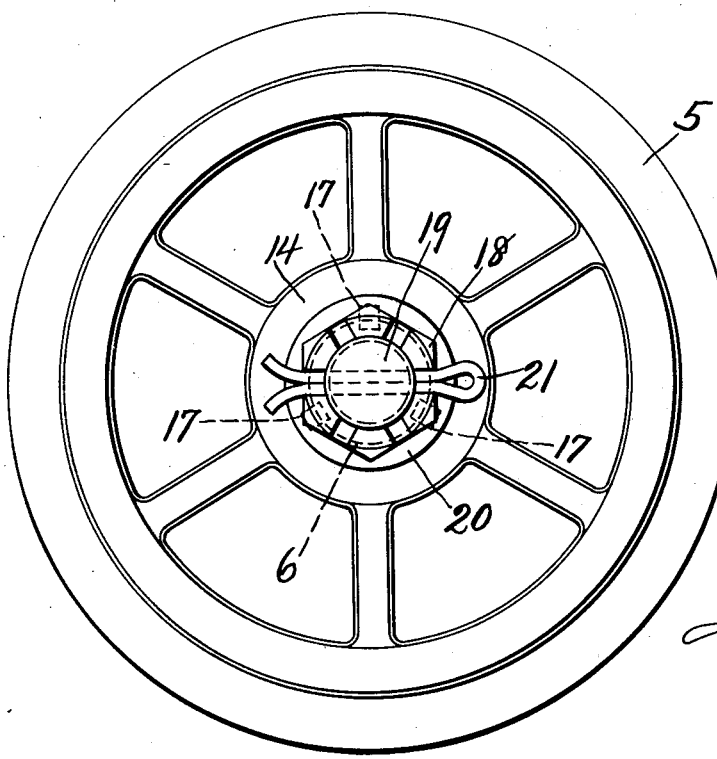
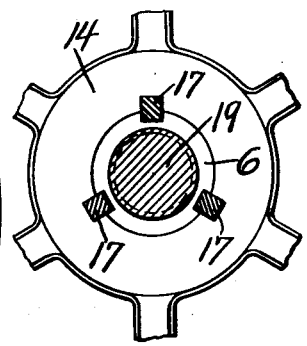
F. H. Gibbs
INVENTOR Patented June 7, 1927.

1,631,318

UNITED STATES PATENT OFFICE.

FREDERICK H. GIBBS, OF BROOKLYN, NEW YORK, ASSIGNOR TO AMERICAN CAR AND FOUNDRY COMPANY, OF NEW YORK, N. Y., A CORPORATION OF NEW JERSEY.

ANTIFRICTION-BEARING APPLICATION.

Application filed June 16, 1926. Serial No. 116,370.

In the drawings:

Fig. 1 is a fragmentary vertical longitudinal sectional view, showing a car wheel, axle, and associated parts, including an antifriction bearing applied in accordance with my invention.

Fig. 2 is a view of the wheel and the parts outside it from the right of Fig. 1.

Fig. 3 is a fragmentary view of the wheel hub, similar to Fig. 2 but with certain parts in section as indicated by the lines 3—3 in Fig. 1.

My invention relates to the application of anti-friction bearings, and is especially adaptable and advantageous for railway cars and the like, though not altogether limited to such uses. I aim to provide for adjusting the anti-friction bearings conveniently, accurately, and truly, and also for their protection and lubrication. In the present instance, I have shown and described the invention in connection with a rolling type of bearing equipped with conical rollers as its anti-friction elements, inasmuch as such rollers are preferred to balls or cylindrical rollers for heavy duty under circumstances requiring adjustment from time to time. In this particular embodiment of the invention, the axle turns with the rotating wheel part, which is secured or fixed to the axle; accordingly, the anti-friction bearing is shown as interposed not between the wheel and the axle, but between the axle and an associated part mounted on the axle. In its broader aspects, nevertheless, the invention is not confined to these relations of axle, wheel, axle mounting, and bearing,—although for railway service they generally represent an advantageous arrangement.

In Fig. 1 is shown a car wheel 5 fixed tight and fast on one end of an axle 6 in any suitable manner, as by pressing on. A conical roller bearing 7 is provided for the axle 6 at one side of the wheel 5, in the present instance at its inner side. The bearing 7 is arranged in any suitable casing or axle housing 8. Preferably, the outer race 9 of the bearing 7 is seated with a tight fit (and thus fixed) in the outer end of the axle housing 8, against a shoulder 10, while the inner race 11 fits rather snugly but freely on the axle 6, so that it may be shifted therealong for purposes of adjustment, as hereinafter described. As shown in Fig. 1, the axle housing which encloses the axle 6 as well as the bearing 7. A dust excluding joint may be formed between an end portion of the housing 12 and the rotating wheel 5 by means of a more or less elastic packing 13 mounted in the outer end of the housing and internally engaging a finished, truly circular outer surface on the end of the wheel hub 14. The packing 13 may be mounted between the inturned flanges of nested sheet-metal collars 15, 16, which fit tightly in the outer end of the housing 12 beyond the bearing 7.

As here shown, the bearing 7 is adjustable (by movement of the race 11) from the other (outer) side of the wheel 5, without necessity for removal or disturbance of the wheel or any other parts. For this purpose, I may provide means extending through (or in) one, at least, of the members 5 and 6,—in the present instance both. By employing for this means a plurality of longitudinally movable members or keys 17, arranged in corresponding internal and external grooves in the wheel hub 14 and in the axle 6, I am able to distribute them at such intervals around the axle 5 and the bearing 7 as to avoid any tendency to "cock" the bearing in adjusting it, and at the same time to minimize weakening of the wheel and axle joint and leakage of lubricant out of the casing 8 at the members 17. The longitudinal position of the members 17 may be determined and adjusted by means carried by the axle 6, such as a head or flange formed by a castellated nut 18 screwed on a reduced threaded projection or stud 19 at the outer end of the axle, with a washer 20 at its inner side. While the stud 19 might be formed separately and threaded in a tapped hole in the end of the axle 6, in the present instance I have shown this stud formed integral with the axle, by turning down its outer end. The nut 18 may be secured in adjusted position on the stud 19 by inserting a cotter pin 21 through a diametral hole in the end of the stud 19 and the registering slots of the nut. Preferably, several (i. e. more than two) counterpart members 17 are employed, and spaced equally: e. g., the drawing shows three of these members, 120° apart on centers, extending between the movable race 11 of the bearing 7 and the head or shoulder formed by the parts 18, 20.

As will readily be seen from Figs. 1 and 3, the members 17 are adapted to engage both the wheel 5 and the axle 6, so as to serve as keys for insuring against rotation of the wheel 5 on the shaft 6, although they are not tight in their grooves or "key-ways" as ordinary keys are usually made. Accordingly, these members 17 are shown of rectangular cross-section. Also, the shoulder or head formed by the nut 18 and washer 19 is shown in Fig. 1 as sufficiently large to afford a safeguard against coming off of the wheel 5 in case it should work loose on axle 6.

It will be understood that in railway work the construction shown in the drawings will usually be duplicated for the other end of the axle, which is not shown in Fig. 1, and the housing 12 may be formed as part of a truck side frame or a journal box if desired.

It is evident that if wheels are to be pressed upon an axle for use in railway work, an accepted method of procedure would be to follow standard and recommended practice of the American Railway Association as it may be modified from time to time. This practice now calls for a pressure of 6½ tons to 8½ tons per inch of axle diameter, hence the wheel is so held upon the axle by the frictional contact thus obtained that the wheels and axle necessarily function in service as if they were integral.

In other service where speeds are not so high it is obvious that less pressure may be employed to accomplish the desired result.

What I claim is:

1. The combination with an axle and a wheel frictionally held thereon, of an anti-friction rolling bearing for the axle at one side of the wheel, and means for adjusting said bearing operable from the other side of the wheel.

2. The combination with an axle and a wheel frictionally held thereon, of an anti-friction rolling bearing for the axle at one side of the wheel, and means extending through the axle for adjusting said bearing from the other side of the wheel.

3. The combination with an axle and a wheel frictionally held thereon, of an anti-friction rolling bearing for the axle at one side of the wheel, and means extending through the wheel for adjusting said bearing from the other side of the wheel.

4. The combination with an axle member and a wheel member frictionally held thereon, of an anti-friction rolling bearing for the axle member at one side of the wheel member, and means for adjusting said bearing from the other side of the wheel member extending through at least one of said members, and distributed at such intervals around the bearing as to obviate any cocking action thereon.

5. The combination with an axle, a wheel, and a mounting for the axle, of an anti-friction rolling bearing interposed between the axle and one of said other parts, adjusting means carried by the axle including a flange at the opposite side of the part in which the bearing is not from the part in which it is; and a plurality of longitudinally movable members extending between said bearing and flange through one of the parts, and so distributed around the bearing as to avoid any cocking action thereon.

6. The combination with a car axle and a car wheel thereon, of an anti-friction rolling bearing for the axle at one side of the wheel, and means for keying the wheel to the axle movable in an axial direction to thereby adjust the bearing.

7. The combination with a car axle and a car wheel thereon, of an anti-friction rolling bearing for the axle to the inside of the wheel, means for keying the wheel to the axle movable therealong to thereby adjust the bearing, and screw means carried by the axle for actuating said keying means, operable from the outer side of the wheel.

8. The combination with a car axle and a car wheel tight fast thereon, of an anti-friction rolling bearing for the axle inside the wheel, adjusting screw means carried by the axle including a head outside the wheel, and several longitudinally movable keys extending between said bearing and head in engagement with both wheel and axle, and so distributed around the bearing as to avoid any cocking action thereon.

9. In combination, a roller bearing assembly, a wheel splined on an axle and means for adjusting said roller bearing assembly through the splined connection of said wheel and axle.

10. In combination, a roller bearing member movable longitudinally of an axle, a wheel frictionally held on said axle and means seated in said axle adapted to adjust said member.

11. The combination with a car axle and its housing, and a car wheel tight fast on the axle having a close rotary joint with the housing, of an anti-friction rolling bearing for the axle in the housing, and means for adjusting said bearing in the housing from the other side of the wheel.

12. The combination with a car axle and its housing, and a car wheel tight fast on the axle having a close rotary joint with the housing, of an anti-friction rolling bearing for the axle in the housing, and means for adjusting said bearing in the housing from the other side of the wheel, extending through at least one of said members and distributed at such intervals around the bearing as to obviate any cocking action thereon while at the same time minimizing the leakage passages along said means.

13. The combination with an axle and a wheel held thereon by direct frictional engagement therewith, of a roller bearing for the axle at one side of the wheel and means for adjusting said bearing from the other side of the wheel.

14. The combination with an axle and a wheel contacting therewith, of an anti-friction rolling bearing for the axle at one side of the wheel, and means for adjusting said bearing operable from the other side of the wheel.

15. The combination with an axle and a wheel contacting therewith, of an anti-friction bearing for the axle at one side of the wheel, and means extending through the axle for adjusting said bearing from the other side of the wheel.

16. The combination with an axle and a wheel contacting therewith, of an anti-friction bearing for the axle at one side of the wheel, and means extending through the axle and through said wheel for adjusting said bearing from the other side of the wheel.

In witness whereof I have hereunto set my hand.

FREDERICK H. GIBBS.